FIG. 1
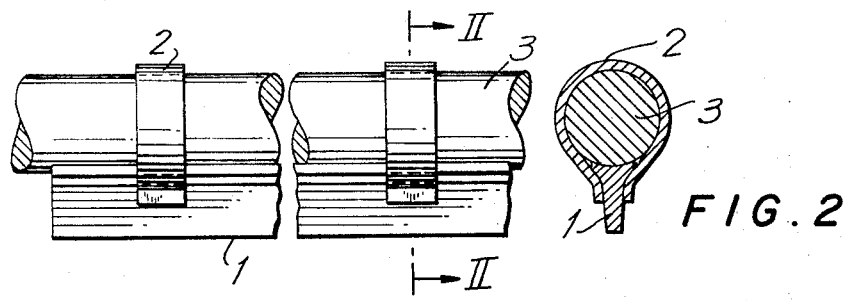
FIG. 2
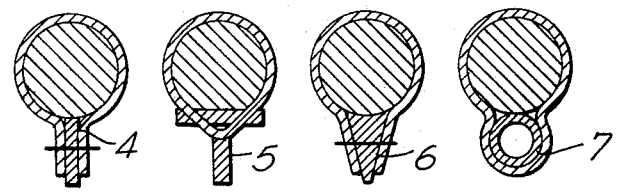
FIG. 3  FIG. 4  FIG. 5  FIG. 6
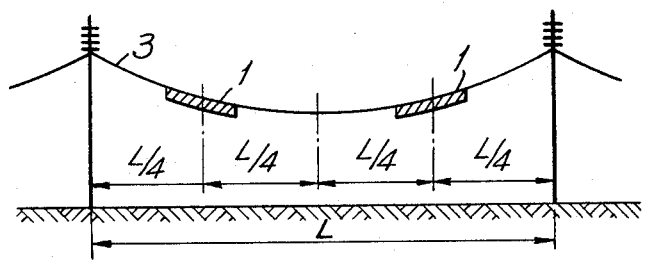
FIG. 7
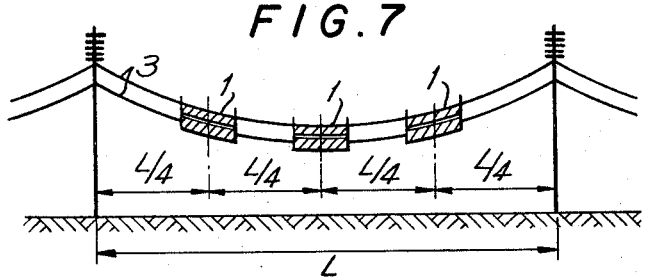
FIG. 8

United States Patent Office 3,388,208
Patented June 11, 1968

3,388,208
OVERHEAD TRANSMISSION LINE WITH AERODYNAMIC DAMPER FOR SUPPRESSING GALLOPING
Alexei Yakovlevich Liberman, ul. Tsialkovskogo 4, kv. 14, Krasnogorsk, Moskovskoi Oblasti, U.S.S.R.
Filed May 5, 1966, Ser. No. 547,829
8 Claims. (Cl. 174—42)

ABSTRACT OF THE DISCLOSURE

An overhead transmission line cable suspended in a span between supporting towers and a damper for suppressing galloping of the cable. The damper is an aerodynamic stabilizer in the form of a rigid elongated element immovably affixed to the cable in a restricted portion of the span length and located on one side of the cable in the vertical plane of cable sag so as to disturb symmetrical air flow around the cable and thus eliminate lift forces causing galloping. The damper can have various cross-sectional shapes. Dampers are preferably positioned in the middle of the span and each half-span.

---

The present invention relates to overhead power transmission lines, and more particularly to devices for suppressing the galloping of conductors.

The known devices for protection of overhead power transmission lines against the galloping of conductors are essentially additional insulating fixtures limiting the movement of the conductors, elements changing the mechanical characteristics of the oscillating system and various mechanical (dynamic and frictional) dampers.

All these devices are either very complicated in design or do not insure adequate protection and therefore are not used in practice.

Short circuits due to the galloping of conductors on transmission lines can be prevented by a proper selection of clearances between the conductors and their disposition and by reducing the spans and sags.

These measures, however, do not eliminate the galloping of conductors, do not avoid mechanical damage caused by this phenomenon and make transmission lines much more expensive.

Protection of ice-covered lines against the galloping of conductors has been effected by well-known methods of cleaning these conductors by mechanical means or melting the ice by electric current.

Stripping the ice by mechanical means is very complicated, consumes much labor and time.

Melting the ice by electric current is not always possible since in a number of cases the network arrangement and the operating conditions of transmission lines, or too low temperature and heavy wind, make it impossible to use this method.

An object of the present invention is to provide a device for protection of overhead power transmission lines against the galloping of conductors which can diminish the oscillation amplitude to such an extent that the occurrence of short circuits and mechanical damage in transmission lines is made impossible.

With this and other objects in view, the invention is embodied in elongated elements fixed parallel to the length of the conductors in a span and changing the distribution of air flow around the conductor surface so as to compensate for lifting forces causing galloping.

The aerodynamic dampers can be made in the shape of square-section, T-section or V-section plates or rods, or else in the shape of tubes.

For overhead transmission lines with a single conductor in phase it is preferable to install aerodynamic dampers in the middle of each half of a span or in the middle of the span (for short spans).

For overhead transmission lines with bundle conductors it is expedient to mount the aerodynamic dampers in the middle of a span and in the middle of each half-span.

The aerodynamic dampers mounted on an overhead transmission line contribute to the increase of aerodynamic stability of conductors and reduce the galloping oscillation amplitude in both cases when it is covered with or free of ice.

Other objects and advantages of the present invention will be best understood from the following description and accompanying drawings, in which:

FIG. 1 shows the device for suppressing the galloping of overhead power transmission lines;

FIG. 2 gives a cross sectional view of the device taken along the line II—II of FIG. 1;

FIG. 3 shows an aerodynamic damper made in the shape of a square-section plate;

FIG. 4 shows the aerodynamic damper of the present invention in the shape of a T-section rod;

FIG. 5 shows the damper in the shape of a V-section rod;

FIG. 6 is the aerodynamic damper in the shape of a tube;

FIG. 7 shows the arrangement of galloping oscillation dampers on transmission lines with a single conductor; and FIG. 8 is a similar view for transmission lines with bundle galloping.

The device for suppressing the galloping of overhead transmission lines is essentially an elongated element (FIGS. 1 and 2) made in the shape of plate or rod 1 attached by means of clip 2 to conductor 3.

Plate or rod 1 is an aerodynamic galloping damper. The damper may be made in the shape of square-section plate 4 (FIG. 3), T-section rod 5 (FIG. 4), V-section rod 6 (FIG. 5), or tube 7 (FIG. 6).

To avoid corona effect the aerodynamic dampers are made of any non-conductive material, such as plastic.

On overhead transmission lines with a single conductor in phase where galloping is likely to occur at a full wave per span, aerodynamic dampers should be installed in the middle of each half-span (FIG. 7).

On short-spans, where galloping takes place at one half-wave per span, aerodynamic dampers are to be placed in the middle of a span.

On lines with bundle conductors, where the galloping at one half-wave per span is most dangerous, the dampers are to be installed at three places: in the middle of a span and in the middle of each half-span (FIG. 8).

Basic dimensions of the aerodynamic dampers (width and length of elongated elements) can be varied within a wide range which makes it possible to reduce the oscillation amplitude to the required safe value.

What is claimed is.

1. A combination of a bare cable of an overhead transmission line, suspended in a span between supporting towers, and a device for suppressing wind-induced galloping of the cable; said device being an aerodynamic stabilizer comprising at least one rigid elongated element affixed to the cable in a restricted portion of the span length so as to be unable to move relative thereto, said element having an operative position in which it is located on one side of the cable, substantially symmetrically with respect to the vertical plane of cable sag; said element disturbing the symmetrical air flow around the cable and creating vortices compensating lift forces causing galloping.

2. A combination as claimed in claim 1, wherein said element is a bar having a rectangular cross-section.

3. A combination as claimed in claim 1, wherein said element is a bar of a T-like section.

4. A combination as claimed in claim 1, wherein said element is a bar of a V-like section.

5. A combination as claimed in claim 1, wherein said element is a tube.

6. A combination as claimed in claim 1 wherein at least one of said elements is secured to the cable in the middle of the span length.

7. A combination as claimed in claim 1, wherein elements are secured to the cable in the middle of the length of each half-span.

8. A combination as claimed in claim 1, wherein elements are secured to the cable in the middle of the span length and in the middle of the length of each half-span.

References Cited

UNITED STATES PATENTS

| | | | |
|---|---|---|---|
| 1,861,675 | 6/1932 | Wolfson et al. | 174—70 |
| 1,999,502 | 4/1935 | Hall. | |
| 3,098,892 | 7/1963 | Spade et al. | 174—47 |
| 3,192,310 | 6/1965 | Forest | 174—127 |

FOREIGN PATENTS

| | | |
|---|---|---|
| 1,081,423 | 6/1954 | France. |

OTHER REFERENCES

Alcoa Aluminum Overhead Conductor Engineering Data (section 4)—Overhead Conductor Vibration, 1961, pp. 4–27 and 4–28.

LARAMIE E. ASKIN, *Primary Examiner.*